United States Patent
Nakagawa et al.

(10) Patent No.: US 8,327,333 B2
(45) Date of Patent: Dec. 4, 2012

(54) APPARATUS, METHOD, AND SYSTEM OF ASSISTING SOFTWARE DEVELOPMENT

(75) Inventors: Masaki Nakagawa, Yokohama (JP); Soichiro Iga, Machida (JP)

(73) Assignee: Ricoh Company, Limited, Tokyo (JP)

( * ) Notice: Subject to any disclaimer, the term of this patent is extended or adjusted under 35 U.S.C. 154(b) by 869 days.

(21) Appl. No.: 12/468,511

(22) Filed: May 19, 2009

(65) Prior Publication Data

US 2009/0293042 A1 Nov. 26, 2009

(30) Foreign Application Priority Data

May 20, 2008 (JP) .................................. 2008-131848
Apr. 27, 2009 (JP) .................................. 2009-107629

(51) Int. Cl.
*G06F 9/44* (2006.01)
(52) U.S. Cl. ........................................................ 717/124
(58) Field of Classification Search ................... 717/124
See application file for complete search history.

(56) References Cited

U.S. PATENT DOCUMENTS

| 7,484,226 B2 * | 1/2009 | Brooks et al. ................. 719/330 |
| 2004/0243338 A1 | 12/2004 | Sabiers et al. |
| 2005/0021276 A1 * | 1/2005 | Southam et al. ............... 702/122 |
| 2006/0265475 A9 * | 11/2006 | Mayberry et al. ............. 709/219 |

FOREIGN PATENT DOCUMENTS

| JP | 11-237982 | 8/1999 |
| JP | 2006-350729 | 12/2006 |
| WO | WO 2005/082117 A2 | 9/2005 |

OTHER PUBLICATIONS

European communication issued Feb. 1, 2011, in Patent Application No. 09160734.1-1225.

* cited by examiner

*Primary Examiner* — Wei Zhen
*Assistant Examiner* — Lanny Ung
(74) *Attorney, Agent, or Firm* — Oblon, Spivak, McClelland, Maier & Neustadt, L.L.P.

(57) ABSTRACT

An apparatus, method, and system of assisting a user in the process of developing software having a function to access a web service are disclosed. A determination result is generated, which indicates whether an operation test of determining whether the software under development properly operates should be performed by a first test module or a second test module. Based on the determination result, the operation test is performed by a selected one of the first test module and the second test module.

14 Claims, 11 Drawing Sheets

FIG. 5

```
public static void main ( ) {
    int number = 5 ;
    // ......
}
```
S1

| ID | FUNCTION NAME | SERVICE ID | MODE | VALUE | TEMPLATE |
|---|---|---|---|---|---|
| 1 | calc | 1 | COLLECTION | 2+3 | `<?xml version=" 1.0" encoding=" utf-8" ?>`<br>`<feed xmlns=" http://www.w3.org/2005/Atom" >`<br>`<title>Example title</title>`<br>`<subtitle>example subtitle</subtitle>`<br>`<link href=" http://example.com/service" />`<br>`<updated>2006-12-15T18:30:12Z</updated>`<br>`<author>`<br>  `<name>Taro Tanaka</name>`<br>  `<email>tanaka@example.com</email>`<br>`</author>`<br>`<id>urn:uuid:80b76c80-d399-11d9-b93C-0024234e0de3</id>`<br>`<entry>`<br>  `<title>atom test</title>`<br>  `<link href=" http://example.com/service/2006/12/15" />`<br>  `<id>urn:uuid:1234c695-cfb8-8ebb-bbbb-90da356efb6c</id>`<br>  `<updated>2006-12-15T18:30:12Z</updated>`<br>  `<summary>This is a summary</summary>`<br>`</entry>`<br>`</feed>` |
| 2 | filter | 2 | EDIT | | `<?xml version=" 1.0" encoding=" utf-8" ?>`<br>`<feed xmlns=" http://www.w3.org/2005/Atom" >`<br>...<br>`</feed>` |
| 3 | save | 2 | OUTPUT | | `<?xml version=" 1.0" encoding=" utf-8" ?>`<br>`<feed xmlns=" http://www.w3.org/2005/Atom" >`<br>...<br>`</feed>` |
| ... | ... | ... | ... | | ... |

FIG. 13

```xml
<?xml version=" 1.0" encoding=" utf-8" ?>
<feed xmlns=" http://www.w3.org/2005/Atom" >
  <title>Example title</title>
  <subtitle>example subtitle</subtitle>
  <link href=" http://example.com/service" />
  <updated>2006-12-15T18:30:12Z</updated>
  <author>
     <name>Taro Tanaka</name>
     <email>tanaka@example.com</email>
  </author>
  <id>urn:uuid:80b76c80-d399-11d9-b93C-0024234e0de3</id>
  <entry>
     <title>atom test</title>
     <link href=" http://example.com/service/2006/12/15" />
     <id>urn:uuid:1234c695-cfb8-8ebb-bbbb-90da356efb6c</id>
     <updated>2006-12-15T18:30:12Z</updated>
     <summary>This is a summary</summary>
  </entry>
</feed>
```

FIG. 14

```
title
            MEETING A
link href
            http://www.aaa.bbb.ccc
published
            1995-12-15
updated
            2003-03-20T10:00:00Z
summary
            SCHEDULE
```

APPARATUS, METHOD, AND SYSTEM OF ASSISTING SOFTWARE DEVELOPMENT

CROSS-REFERENCE TO RELATED APPLICATIONS

This patent application is based on and claims priority under 35 U.S.C. §119 to Japanese Patent Application Nos. 2008-131848 filed on May 20, 2008, and 2009-107629 filed on Apr. 27, 2009 in the Japanese Patent Office, the disclosure of which is hereby incorporated herein by reference.

FIELD OF THE INVENTION

The present invention generally relates to an apparatus, method, and system of assisting software development, and more specifically to an apparatus, method, and system of assisting the process of testing software under development having a function to access a web service.

BACKGROUND

In the field of software development, the component-based software development has been recently introduced, which develops software by assembling pre-existing software components that provide functions common to many different systems, for example, as described in the Japanese Patent Application Publication Nos. H11-237982 and 2006-350729.

While the component-based software development may contribute to the improved efficiency in software development, the software under development needs to be checked to see if the software operates properly, for example, by executing the software. The need for such operation test may require additional time, especially when the software has a function to access a web service.

For example, the software having a function to access a web service may be developed by integrating software components, which may be previously prepared, using a desired programming language such as Java. The developer then checks whether the software under development operates properly by accessing the web service and executing a web service function provided by the software. In order to have access to the web service, the developer is usually required to take preparatory steps. For example, registration may be required to have access to the web service. Further, since the web service is an application that runs on the web, the developer may not be able to freely change data managed by the web service during the operation test process.

Assuming that the software under development is made of a component having the function of obtaining schedule information from a particular web service that manages the user's schedule, in order to check whether the software can receive an expected result for the particular web service, access to the particular web service is required. Further, when the developer decides to check editing function of such schedule information, the developer needs to be authorized or have approval from another person who is authorized before the developer is able to edit the schedule information. The above-described preparatory steps before the operation test process has been time consuming and cumbersome.

SUMMARY

Example embodiments of the present invention include an apparatus, method, system, and computer readable recording medium, each capable of assisting a user in the process of developing software having a function to access a web service.

For example, a software development assistance apparatus, which includes: a service store module to store in a memory service function information regarding one or more functions provided by a set of software components available for use in developing the software, the set of software components providing at least a function to access a web service through a network; an analyzing module to analyze the software under development to generate an analysis result indicating at least one function to be used for an operation test of determining whether the software under development properly operates; a first test module to perform the operation test using the at least one function indicated by the analysis result while accessing the web service; a second test module to perform the operation test using the at least one function indicated by the analysis result without accessing the web service; a test determination module to obtain service function information that corresponds to the at least one function indicated by the analysis result from the service function information stored in the service store module, to determine whether the operation test is to be performed by the first test module or the second test module based on the service function information that corresponds to the at least one function indicated by the analysis result to generate a determination result, and to cause one of the first test module and the second test module that is selected based on the determination result to generate a test result by performing the operation test; and a display module to display the test result through a display device.

In another example, a method of assisting a user in the process of developing software may be provided, which includes: storing, in a memory, service function information regarding one or more functions provided by a set of software components available for use in developing the software, the set of software components providing at least a function to access a web service through a network; analyzing the software under development to generate an analysis result indicating at least one function to be used for an operation test of determining whether the software under development properly operates; providing a first test module to perform the operation test using the at least one function indicated by the analysis result while accessing the web service; providing a second test module to perform the operation test using the at least one function indicated by the analysis result without accessing the web service; determining whether the operation test is to be performed by the first test module or the second test module based on service function information that corresponds to the at least one function indicated by the analysis result obtained from the service function information stored in the service store module to generate a determination result; causing one of the first test module and the second test module that is selected based on the determination result to generate a test result by performing the operation test; and displaying the test result through a display device.

In addition to the above-described example embodiments, the present invention may be practiced in various other ways, for example, as a system including the above-described software development assistance apparatus or a computer readable recording medium including computer program instructions which cause a computer to execute the above-described method of assisting a user in the process of developing software.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is an illustration for explaining the display of an analysis result indicating at least one function to be used for determining whether software under development properly operates in the form of a character string, performed by the software development assistance apparatus of FIG. 1, according to an example embodiment of the present invention;

FIG. 8 is an illustration for explaining a service function information table storing service function information regarding one or more functions of the one or more services provided by the set of software components available for use in the process of developing software;

FIG. 13 is an illustration for explaining the test result displayed by the software development assistance apparatus of FIG. 3, according to an example embodiment of the present invention; and FIG. 14 is an illustration for explaining the test result displayed by the software development assistance apparatus of FIG. 3, according to an example embodiment of the present invention.

Figure 1:
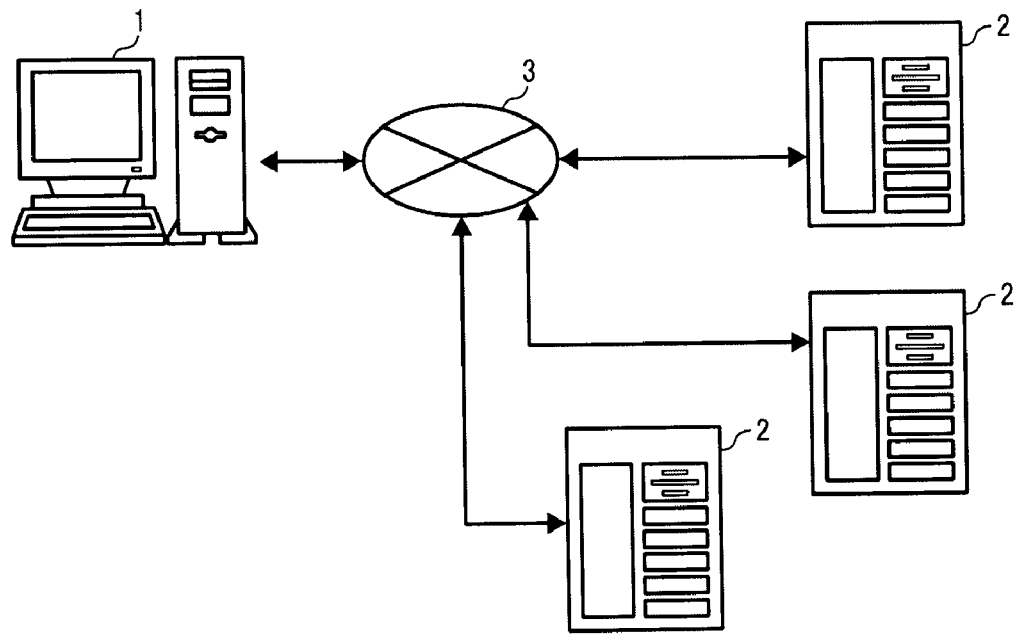
FIG. 1 is a schematic block diagram illustrating a structure of a software development assistance system including a software development assistance apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, a structure of a software development assistance system is explained according to an example embodiment of the present invention. The software development assistance system of FIG. 1 includes a software development assistance apparatus 1, which are connected to one or more of a plurality of service servers 2 through a network 3.

The software development assistance apparatus 1 may be implemented by any desired information processing apparatus such as a work station computer or a personal computer (PC). For the descriptive purpose, the software development assistance apparatus 1 may be referred to as the PC 1. In this example, the PC 1 is connected to the network 3, which may be implemented by the Internet, such that the PC 1 may be provided with any desired service from the service servers 2 through the network 3. For example, the PC 1 may receive a web service from any one of the service servers 2. In such case, at least one of the service servers 2 may be provided with a web service. In this example, the service servers 2 may each be implemented by a processor and a storage device. Further, the network 3 may be implemented by any desired type of network such as wireless or wired. Further, the PC 1 may be connected to the network 3 through a local area network (LAN).

Figure 2:
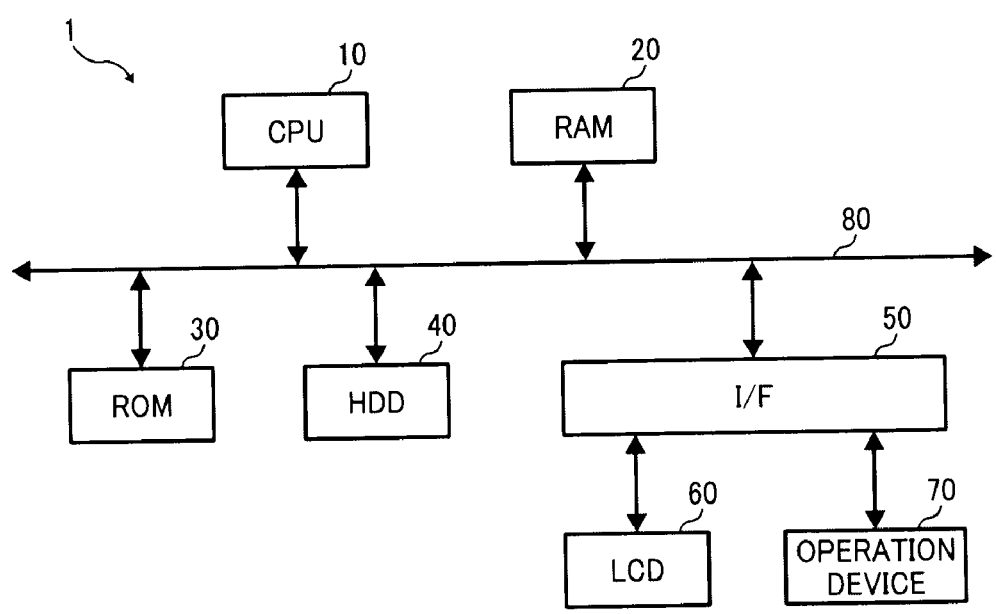
FIG. 2 is a schematic block diagram illustrating a hardware structure of the software development assistance apparatus of FIG. 1.

Still referring to FIG. 1, the PC 1 includes a display device to display a bitmap image screen such as a liquid crystal display (LCD) 60 of FIG. 2, and an operation device 70 of FIG. 2 to receive a user input including a pointing device such as a mouse, or a keyboard.

FIG. 2 illustrates an example hardware structure of the PC 1 of FIG. 1. The PC 1 includes a central processing unit (CPU) 10, a random access memory (RAM) 20, a read only memory (ROM) 30, a hard disk drive (HDD) 40, and an interface (I/F) 50, which are connected through a bus 80. The PC 1 further includes the LCD 60 and the operation device 70, each are connected to the I/F 50.

The CPU 10 includes any desired processor capable of controlling operation of the PC 1. The RAM 20 includes any desired readable and writable volatile memory, which stores information to be accessed by the CPU 10 at relatively high speeds such that it may function as a work area of the CPU 10.

The ROM 30 includes any desired readable nonvolatile memory, which stores various data such as firmware program. The HDD 40 includes any desired readable and writable nonvolatile memory, which stores various data such as operating system (OS), various control programs, or application programs.

The I/F 50 controls data exchange among various devices of the PC 1 through the bus 80, or controls data exchange between the PC 1 and the outside of the PC 1. The LCD 60 functions as a user interface, which displays various information such as information regarding the status of the PC 1 to the user. The operation device 70, which may be implemented by the keyboard and/or the mouse, functions as a user interface, which allows the user to input various user instructions to the PC 1.

In this example, the PC 1 checks whether software under development operates properly by performing the operation test for one or more functions provided by at least one of the software components to be integrated into the software. The PC 1 may be provided with a software development assistance program, which may be previously stored in a storage device such as the ROM 30, the HDD 40, a recording medium such as an optical disc that may be readable by the PC 1, or any device that may be accessible by the PC 1 through the network 3. Upon execution, the software development assistance program may be loaded onto the RAM 10 to cause the CPU 10 to function as the software development assistance apparatus 1. More specifically, one or more devices of the PC 1 illustrated in FIG. 2 is caused to function as one or more modules illustrated in FIG. 3 to perform operation of assisting development software according to the software development assistance program.

Figure 3:
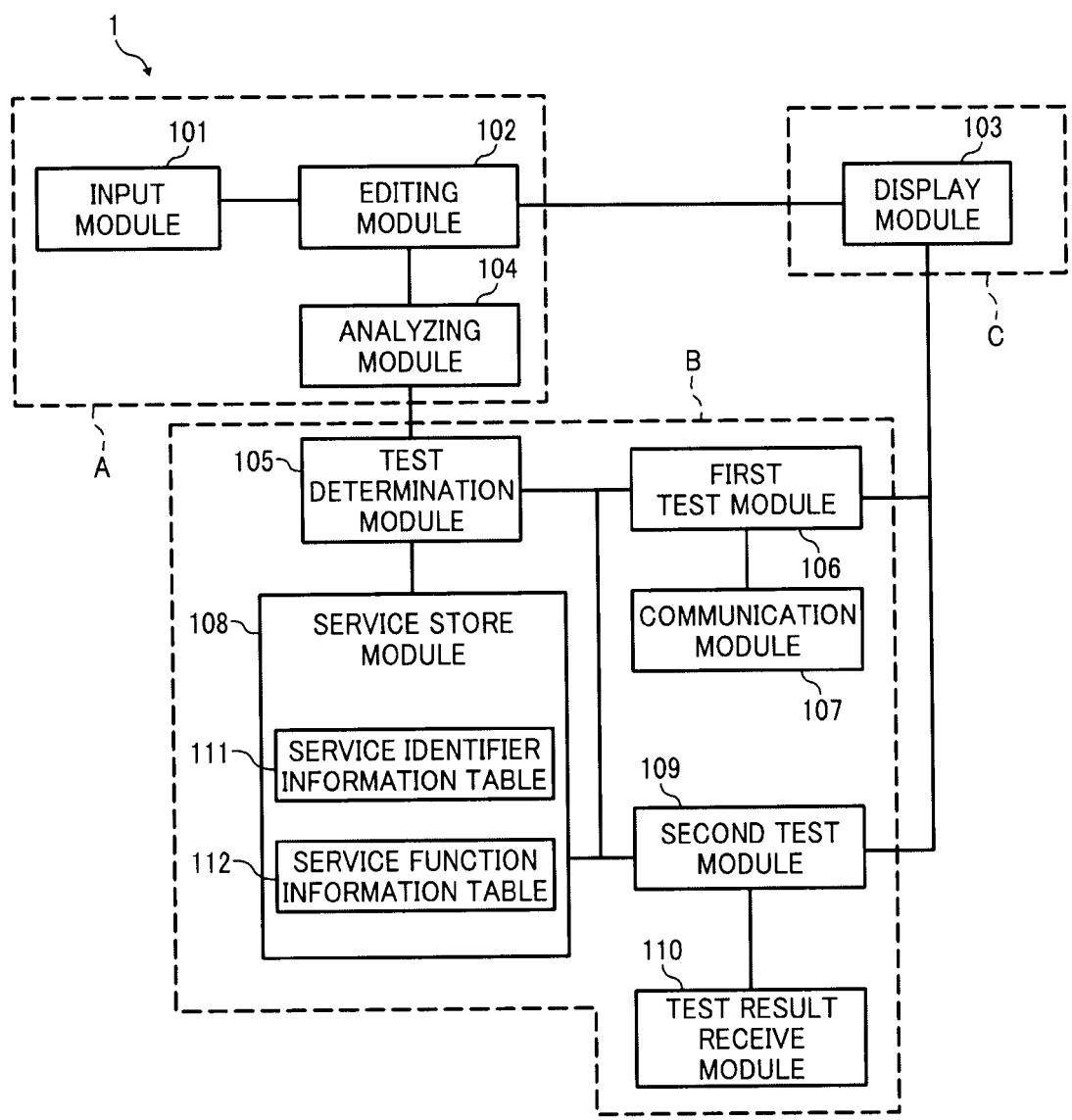
FIG. 3 is a schematic block diagram illustrating a functional structure of the software development assistance apparatus of FIG. 1.

Referring to FIG. 3, a functional structure of the PC 1, or the software development assistance apparatus 1, is explained according to an example embodiment of the present invention. The software development assistance apparatus 1 includes a plurality of modules including an input module 101, an editing module 102, a display module 103, an analyzing module 104, a test determination module 105, a first test module 106, a communication module 107, a service store module 108, a second test module 109, and a test result receive module 110.

In this example, any module may be implemented as a hardware circuit including integrated circuits, gate arrays, logical chips, transistors, etc., which may be programmable. Any module may also be implemented as an executable code for execution by any desired processor including computer instructions, which may be organized as an object, procedure, function, etc. Alternatively, any module may also be implemented by an integration of the hardware structure and the software structure. Further, the modules may not be physically located together such that the modules may be distributed over different physical locations such as over different storage devices or as electronic signals on the system or the network.

Further, in this example, the modules illustrated in FIG. 3 may be classified into a first layer defined as an analyzing section A, a second layer defined as a test section B, and a third layer defined as a display section C.

The service store module 108 includes a service identifier information table 111 and a service function information table 112, each may be stored in a memory such as the ROM 30 or the HDD 40.

Figure 7:
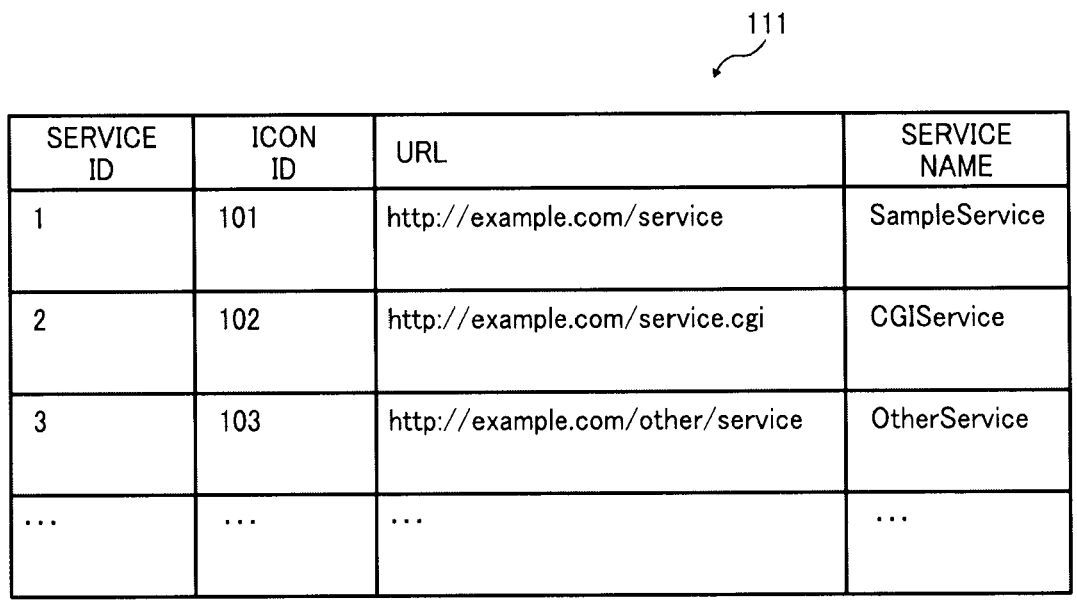
FIG. 7 is an illustration for explaining a service identifier information table storing service identification information regarding one or more services provided by a set of software components available for use in the process of developing software.

The service identifier information table 111 stores service identifier information regarding identification of one or more services provided by a set of software components available for use by the software development assistance apparatus 1 in developing software, for example, as illustrated in FIG. 7. In this example, the service store module 108 may additionally store the set of software components each providing a predefined service. Alternatively, the set of software components may be stocked in any desired memory within or outside the PC 1 in the form available by the software development assistance apparatus 1. The service function information table 112 stores service function information regarding one or more functions provided by one or more services of the set of software components available for use by the software development assistance apparatus 1, for example, as illustrated in FIG. 8.

Referring to FIG. 7, the service identifier information table 111 stores, for each service, a service ID uniquely assigned to the service, a service name uniquely assigned to the service, a URL address indicating the location of the service on the system, and an icon ID uniquely assigned to an icon that corresponds to the service.

Referring to FIG. 8, the service function information table 112 stores, for each function provided by the service, function identifier information regarding identification of one or more functions to be provided by one or more services managed by the service identifier information table 111, and function property information regarding property of one or more functions. More specifically, as illustrated in FIG. 8, the service function information table 112 stores, for each function, a function ID uniquely assigned to the function, a function name uniquely assigned to the function, the service ID of the service providing the function, a mode indicating the type of process to be performed by the function such as collection, edit, output, etc., an input parameter value, and template data. As described below referring to FIG. 11, the input parameter value and the template data may be used by the second test module 109 when the test result is to be generated by the second test module 109 without accessing the web service.

The analyzing section A generates an analysis result, which indicates one or more functions of the developed software that may be used to check whether the software under development properly operates. More specifically, in this example, the analyzing section A includes the input module 101, the editing module 102, and the analyzing module 104. Alternatively, any one of the input module 101 and the editing module 102 may be classified as not belonging to the analyzing section A.

The analyzing module 104 analyzes the software under development to obtain the analysis result indicating at least on function of the software, which may be executed during the operation test to check whether the developed software properly operates. For example, the analyzing module 104 may obtain service function information regarding one or more functions of the software under development that may be used for the operation test by referring to the service identifier information managed by the service identifier information table 111 and the service function information managed by the service function information table 112. In one example, the service function information obtained by the analyzing module 104 may be output as the analysis result to the test module 105. In another example, the service function information obtained by the analyzing module 104 may be output as the analysis result through the display module 103 for display to the user.

The input module 101 receives a user input, for example, through the operation device 70 such as the mouse or the keyboard. The user input may correspond to text data input by the user through the keyboard, the selection of an icon being displayed on the LCD 60 through the mouse, or any processing to be performed on a screen displayed by the LCD 60 through the mouse, etc. In one example, the user or the developer at the PC 1 may input a programming command, which indicates a specific function to be integrated into the software under development. In another example, the display module 103 may cause the display device 60 to display one or more icons each visually representing a service that is available for use in the software under development for selection by the user.

The editing module 102 receives information regarding the user input from the input module 101, and stores such information at least temporarily in a memory such as the RAM 20. The information regarding the user input may include the text data input by the user, or the icon selected or processed by the user, which may correspond to the specific function of the software that is subjected for operation test. The stored information may be sent to the test module 105 as the analysis result.

The test section B obtains the analysis result from the analyzing section A, and generates a test result indicating the result of performing the operation test for the function of the service of the developed software that is indicated by the analysis result. The test section B includes the service store module 108, the test determination module 105, the first test module 106, the communication module 107, and the second test module 109. The test result receive module 110 may be optionally provided.

The test determination module 105 refers to the analysis result indicating at least one function subjected for operation test and the service function information managed by the service store module 108 to determine whether the operation test for the function indicated by the analysis result should be performed by the first test module 106 or the second test module 109 to generate a determination result.

When the determination result indicates that the second test module 109 should perform the operation test, the second test module 109 performs the operation test for the function indicated by the analysis result, by simulating the execution of the function without accessing the web service provided by the service server 2 through the network 3. The result for the operation test may be output to the test result receive module 110.

When the determination result indicates that the first test module 106 should perform the operation test, the first test module 106 performs the operation test for the function indicated by the analysis result, by executing the function while accessing the web service provided by the service server 2 through the network 3 using the communication module 107. The result for the operation test may be output to the test result receive module 110. The test result receive module 110 receives the test result, generated either by the first test module 106 or the second test module 109, and outputs the test result to the display module 103 for display to the user.

The display section C, which includes the display module 103, displays various information to the user through the LCD 60 of FIG. 1. In one example, the display module 103 displays the analysis result generated by the analyzing section A to the user. In another example, the display module 103 displays the test result generated by the test section B to the user.

In this example, when displaying the analysis result, the display module 103 may display the analysis result in one of two display formats. In one format, the display module 103 displays the analysis result, which indicates one or more functions to be used for the operation test, in the form of character string, thus allowing the user to develop the software using any desired programming language such as Java. In another format, the display module 103 displays the analysis result, which indicates one or more functions to be used for the operation test, in the form of icon, thus allowing the user to develop the software using the visual programming such as Visual Basic.

Figure 4:
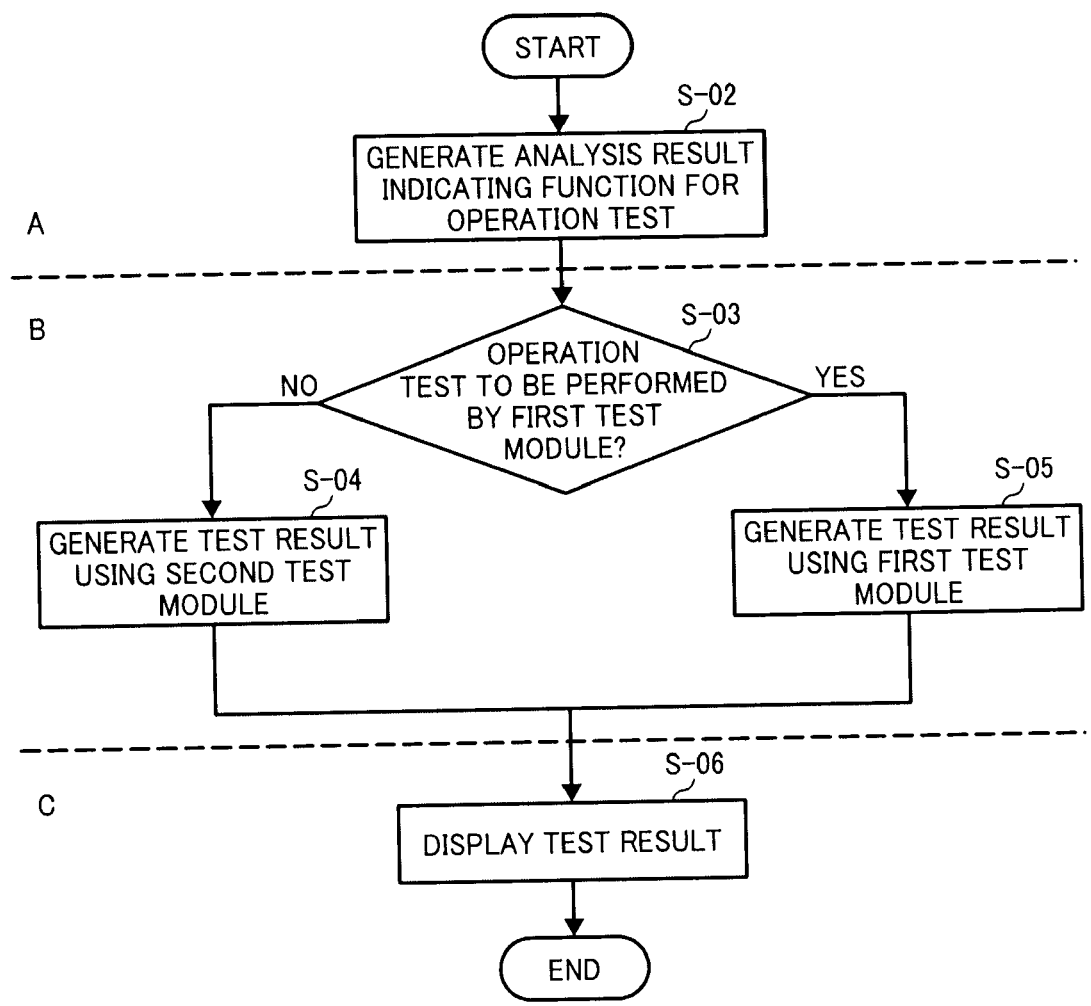
FIG. 4 is a flowchart illustrating operation of assisting the software development process, performed by the software development assistance apparatus of FIG. 1, according to an example embodiment of the present invention.

Referring now to FIG. 4, operation of assisting software development, performed by the software development assistance apparatus 1 of FIG. 3 is explained according to an example embodiment of the present invention. In this example, it is assumed that there is software, which is being developed by assembling a selected set of software components that are available for use by the software development assistance apparatus 1. Further, it is assumed that the software under development has at least a function to access a web service provided by the service server 2 through the network 3. The operation of FIG. 4 is performed in order to check whether one or more functions provided by the software under development properly operates.

At S02, the analyzing section A analyzes the software under development to obtain an analysis result indicating at least one function to be used be used for operation test for checking whether the software under development properly operates. As described below, the function indicated by the analysis result may be selected by the user either by the user input or the user selection.

At S03, the test section B obtains the analysis result indicating the function to be checked for the operation test, and determines whether the function indicated by the analysis result should be tested by the first test module 106 or the second test module 109 to generate a determination result. When the determination result indicates that the function should be tested by the first test module 106 ("YES" at S03), the operation proceeds to S05. When the determination result indicates that the function should be tested by the second test module 109 ("NO" at S03), the operation proceeds to S04.

At S04, the first test module 106 executes the function subjected for the operation test while accessing the web service provided by the service server 2, and outputs the test result.

At S05, the second test module 109 simulates execution of the function subjected for the operation test without accessing the web service provided by the service server 2, and outputs the test result.

At S06, the display module 103 displays the test result output by either one of the first test module 106 and the second test module 109 through the LCD 60, and the operation ends.

Referring now to FIGS. 5 to 9, operation of generating an analysis result, performed by the analyzing section A at S02 of FIG. 4, is explained according to an example embodiment of the present invention.

Figure 5:
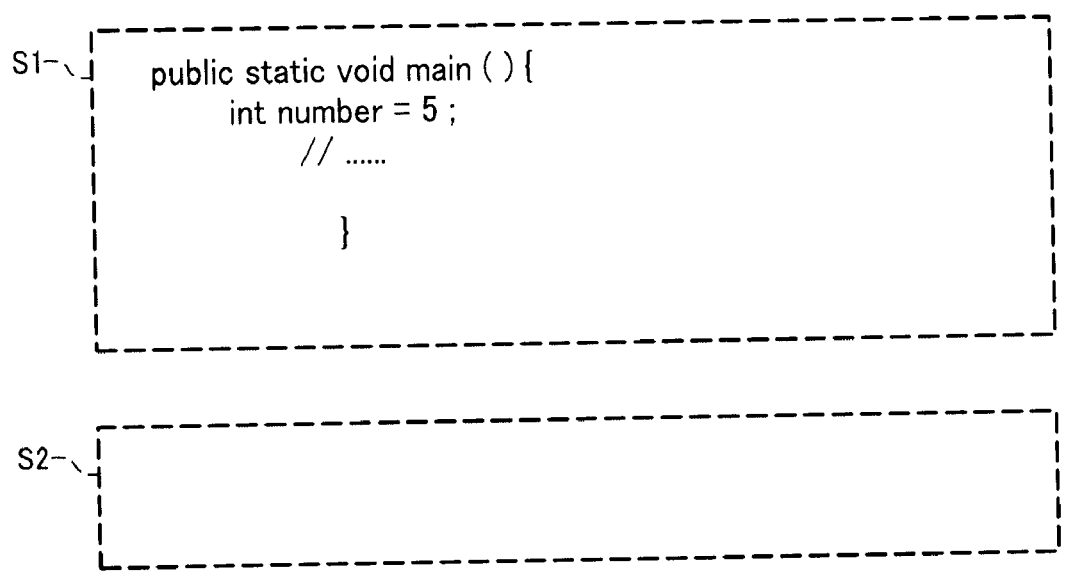
Figure 6:
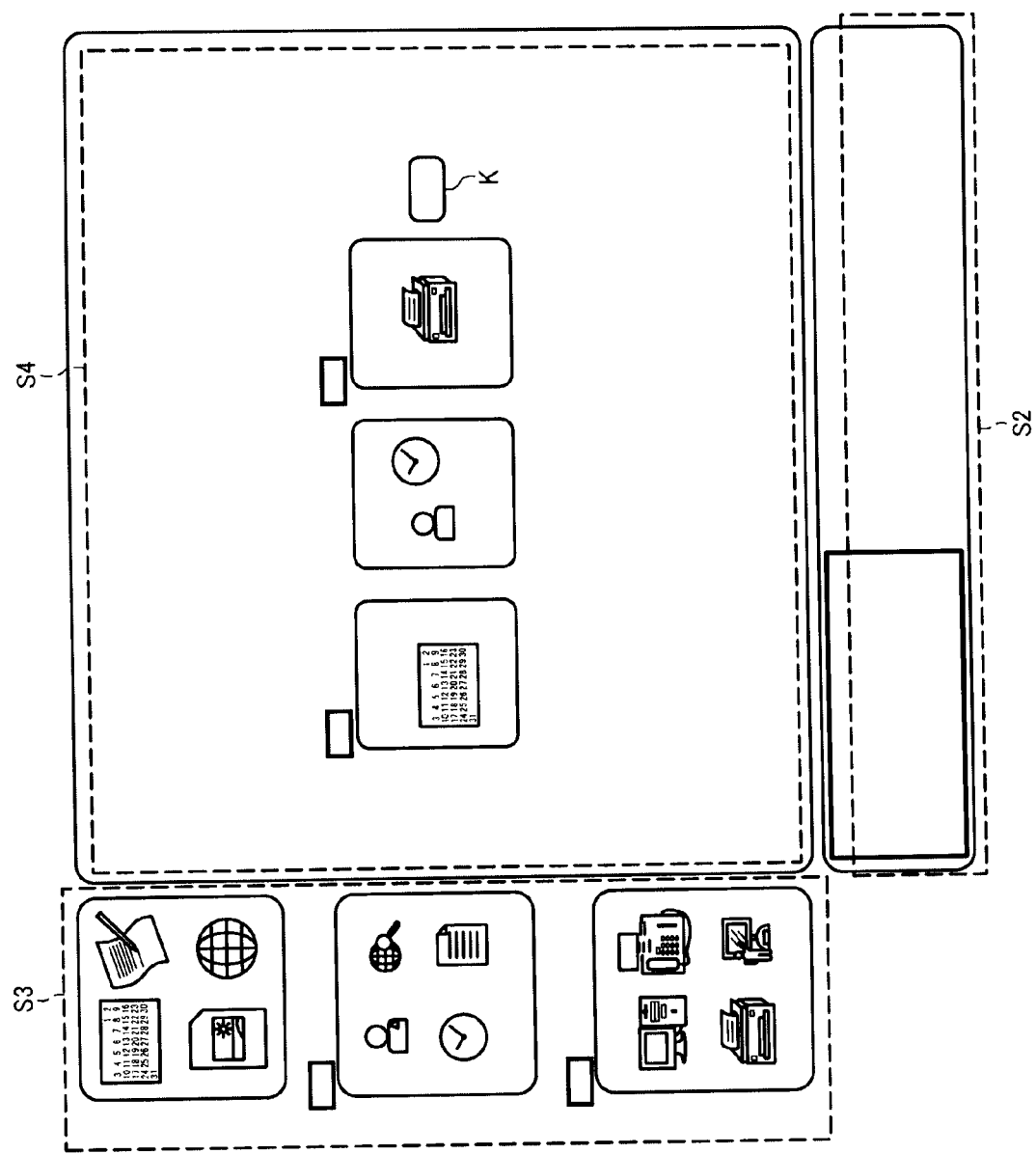
FIG. 6 is an illustration for explaining the display of an analysis result indicating at least one function to be used for determining whether software under development properly operates in the form of an icon, performed by the software development assistance apparatus of FIG. 1, according to an example embodiment of the present invention.

As described above referring to FIGS. 3 and 4, the analyzing module 104 refers to the service identifier information managed by the service identifier information table 111 and the service function information managed by the service function information table 112 to obtain service function information regarding one or more functions provided by the software under development, and outputs the obtained service function information as the analysis result for display to the user. In one example, as illustrated in FIG. 5, the analysis result may be displayed in the form of text data such as a character string together with supplementary information regarding the text data. In another example, as illustrated in FIG. 6, the analysis result may be displayed in the form of icon together with supplementary information regarding the icon.

In the example illustrated in FIG. 5, it is assumed that the user inputs a programming command in any desired programming language in the form of text data such as a character string, using the operation device 70 of FIG. 2 such as the keyboard. The character string input by the user may be displayed in a section S1 of a screen displayed by the LCD 60, together with supplemental information displayed in a section S2. The input module 101 inputs the character string obtained by the user input, and sends the character string to the editing module 102 for storage. The analyzing module 104 refers to the service identifier information table 111 of FIG. 7 to obtain one or more services that correspond to the character string input by the user, which may be read out from the editing module 102. More specifically, in this example, the analyzing module 104 analyzes the character string input by the user, and extracts an object, which is an argument having a class name that corresponds to a particular service name listed in the service identifier information table 111 of FIG. 7.

For example, when the character string is written in Java programming language, the object and the method may be identified by the location of a separator such as a dot "." such that the text data that is located just before the dot "." is identified as the object. Once the object is identified, the analyzing module 104 looks for the service name that corresponds to the class name of the identified object through the service identifier information table 111, and extracts the identified object when the service having the service name that corresponds to the class name of the identified object is found. When there is no service name that corresponds to the class name of the identified object, the analyzing module 104 ends the operation without generating the analysis result. In such case, the analyzing module 104 may cause the display module 103 to return an error message.

When the object is extracted, the analyzing module 104 extracts the class name that corresponds to the extracted object. For example, in the above-described case of writing in Java programming language, the statements of the object may be written as "class name" followed by "object". For example, when "SampleService service;" is extracted from the character string, "SampleService" is extracted as the class name. When there is no class name that is obtainable, the analyzing module 104 ends the operation without generating the analysis result. In such case, the analyzing module 104 may cause the display module 103 to return an error message.

The analyzing module 104 refers to the service identifier information managed by the service identifier information table 111 to determine whether there is any service name that corresponds to the class name extracted from the character string. When there is the service name that corresponds to the extracted class name, the analyzing module 104 obtains the service ID for the identified service name. In the example case of "SampleService", the service ID of "1" is obtained.

Further, using the obtained service ID, the analyzing module 104 obtains a function name that corresponds to the obtained service ID using the service function information table 112. For example, referring to FIG. 8, when the service ID of "1" is obtained that corresponds to the "SampleService", the function name "calc" may be obtained.

Alternatively, in this example, the user may directly input the function name in the form of character string using the operation device 70. Alternatively, the analyzing section 104 may obtain one or more function names each corresponding to the service ID from the service function information table 112, and displays a list of the one or more function names as candidate through the LCD 60. The user may select one of the function names from the displayed list using the mouse. Alternatively, the user may input the character string that specifies one of the function names being displayed using the keyboard.

In the example illustrated in FIG. 6, the analyzing module 104 may cause the LCD 60 to display service identifier information for identifying one or more services available for use in developing the software in the form of icon. In this example, the LCD 60 displays a screen including a icon list section S3 that displays a list of icons each representing one or more services available for use, a icon layout section S4 that displays one or more icons selected from the list of icons of S3 in the form of layout, and the section S2 that displays supplemental information regarding the one or more icons being displayed in the section S4. Specifically, in this example, the user may select an icon from the list of icons displayed in the section S3 by performing the drag-and-drop operation using the mouse that causes the selected icon to move from the section S3 to the section S4. In the example case illustrated in FIG. 6, the service name available for use may be identified in a substantially similar manner as described above referring to FIG. 5. For example, upon selection of the icon by the user input through the input module 101, the editing module 102 stores information regarding the selected icon, such as the icon ID that is previously assigned to each icon. The analyzing module 104 refers to the service identifier information table 111 to obtain the service ID that corresponds to the obtained icon ID.

Figure 9:
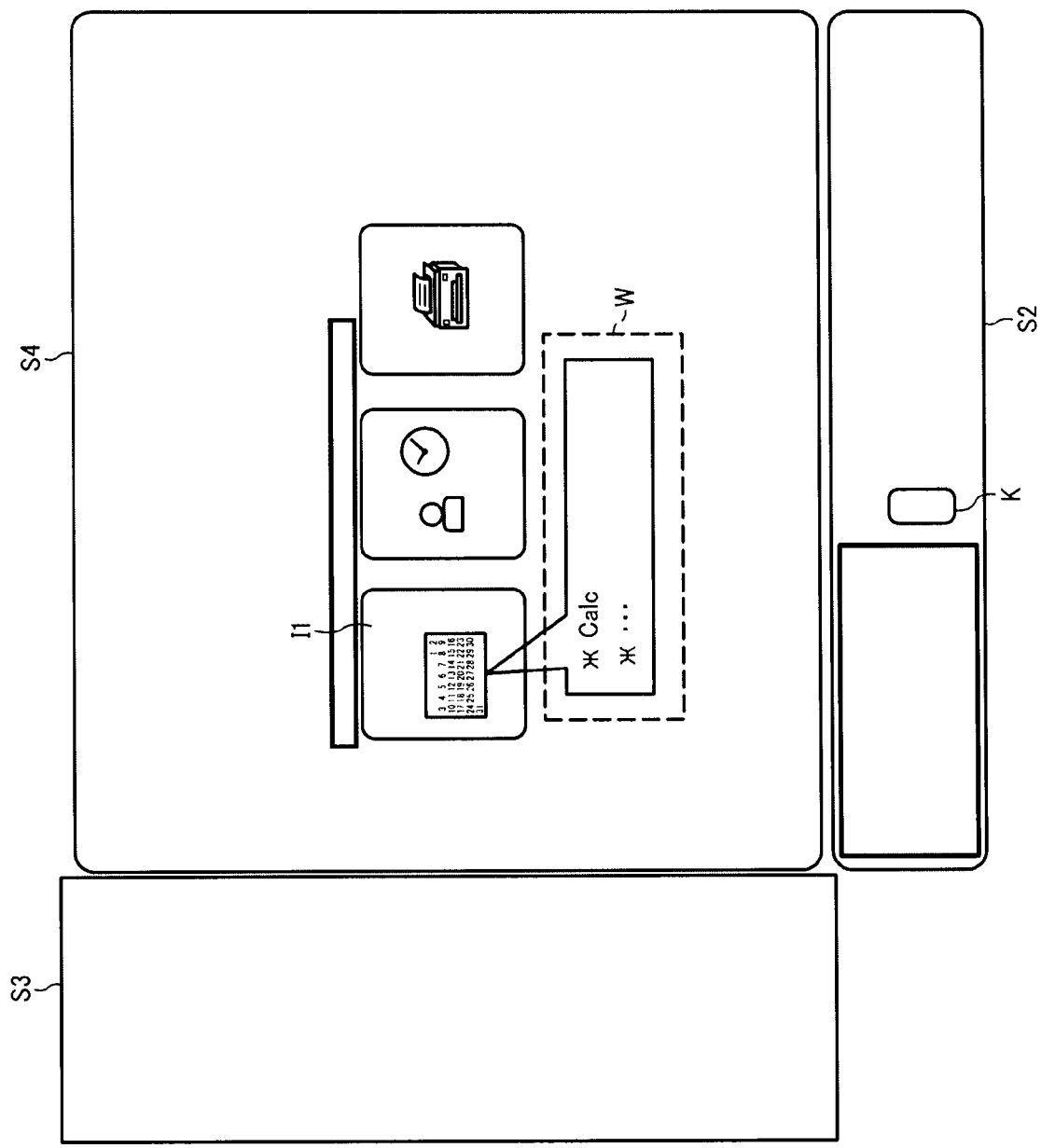
FIG. 9 is an illustration for explaining the display of an analysis result indicating at least one function to be used for determining whether software under development properly operates in the form of icon, performed by the software development assistance apparatus of FIG. 1, according to an example embodiment of the present invention.

When the service ID is obtained, the analyzing module 104 may further obtain one or more function names that correspond to the service ID using the service function information table 112 for display to the user. For example, as illustrated in FIG. 9, when the service ID of "1" is obtained by the selection of icon I1, the analyzing module 104 refers to the service function information table 112 to obtain the function name "calc" that corresponds to the service ID of "1", and displays the function name "calc" in a pop-up window W displayed in the section S4. More specifically, when the user moves the cursor of the mouse to point the icon I1, the pop-up window W may appear that lists one or more function names available for use. The user may further select one or more function names from the list using the mouse. The analyzing module 104 may obtain the selection of the function names, which may be hold by the editing module 102, as the analysis result. In this manner, the analyzing module 104 may assist the user at the PC 1 in developing software, for example, by providing one or more services or one or more functions that are available for use in developing the software.

Figure 10:
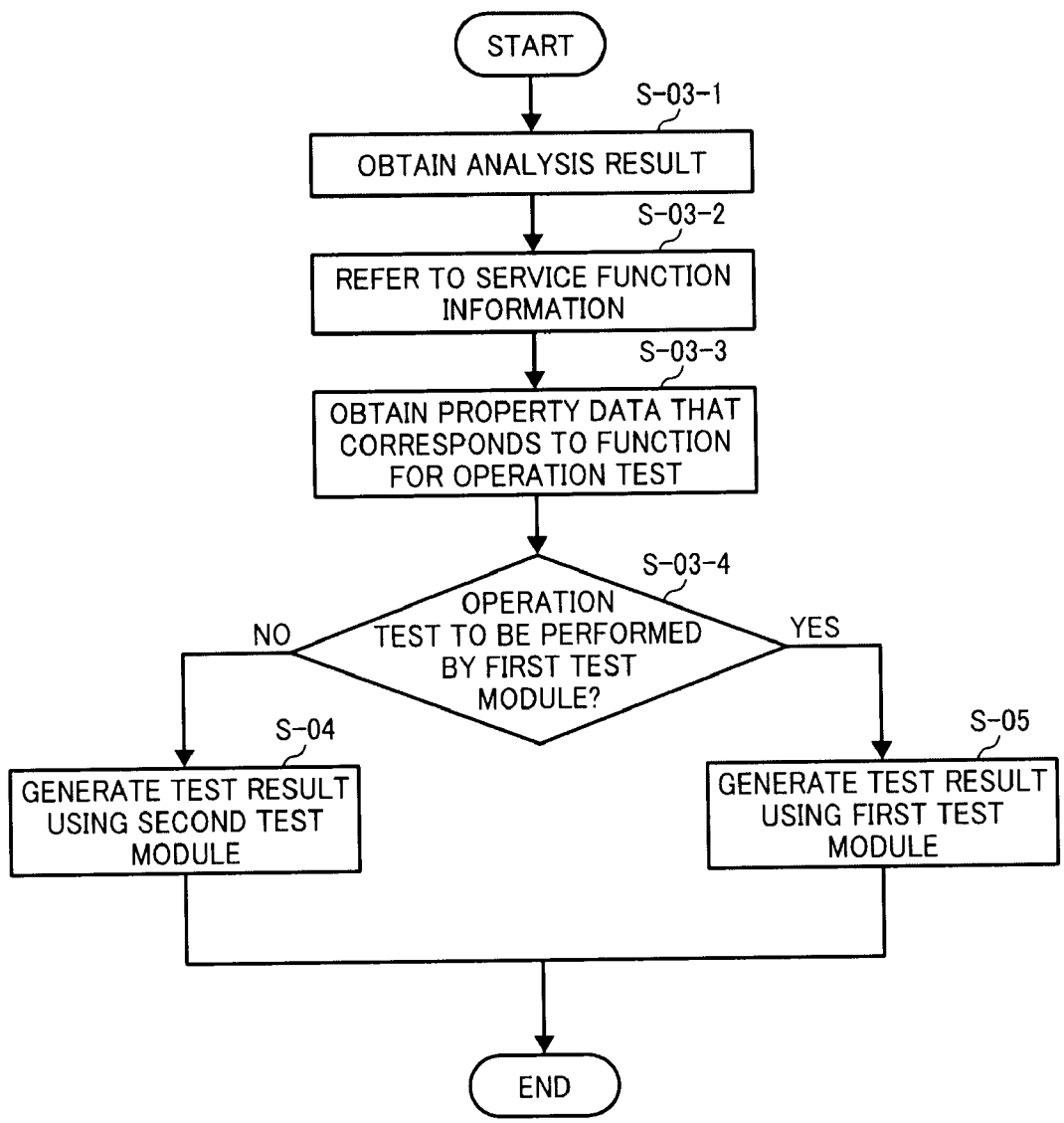
FIG. 10 is a flowchart illustrating operation of generating an analysis result performed by the analyzing section and operation of generating a test result performed by the testing section, according to an example embodiment of the present invention.
Figure 11:
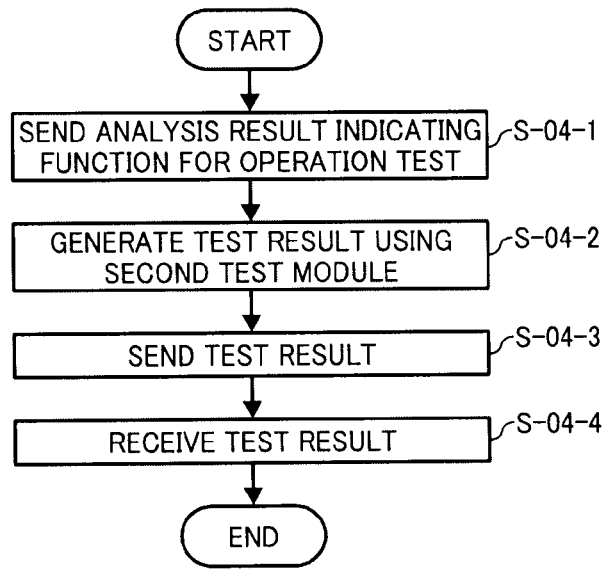
FIG. 11 is a flowchart illustrating operation of performing an operation test, performed by a second test module of the software development assistance apparatus of FIG. 3, according to an example embodiment of the present invention.
Figure 12:
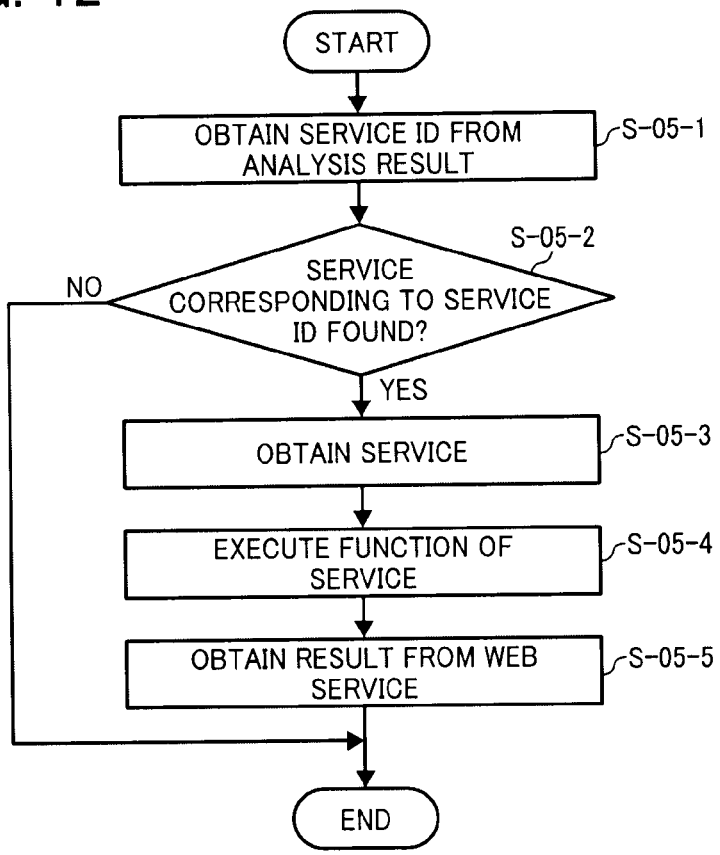
FIG. 12 is a flowchart illustrating operation of performing an operation test, performed by a first test module of the software development assistance apparatus of FIG. 3, according to an example embodiment of the present invention.

Referring now to FIGS. 10 to 12, operation of performing the operation test for determining whether the software under development properly operates by executing one or more functions indicated by the analysis result, performed by the test section B at S03, S04, and S05 of FIG. 4, is explained according to an example embodiment of the present invention.

More specifically, as illustrated in FIG. 10, the test determination module 105 determines whether the operation test for the function indicated by the analysis result should be performed by the first test module 106 or the second test module 109 to generate a determination result. In determination, the test determination module 105 obtains property data that corresponds to the function indicated by the analysis result from the service function information table 112, and determines whether the operation test is to be performed by the first test module 106 or the second test module 109 based on the property data. The property data in this example specifies the process to be performed by the function with respect to the web service, such as the mode of the function illustrated in FIG. 7. More specifically, the test determination module 105 determines that the operation test should be performed by the second test module 109 when the property data indicates that execution of the function causes a state of the web service to physically change. When the property data indicates that execution of the function does not cause a state of the web service to physically change, the test determination module 105 determines that the operation test should be performed by the first test module 106 instead.

When the determination result indicates that the operation test is to be performed by the first test module 106, the first test module 106 performs the operation test by executing the function indicated by the analysis result while accessing the web service. When the determination result indicates that the operation test is to be performed by the second test module 109, the second test module 109 performs the operation test by using the template data obtainable from the service function information managed by the service function information table 112.

Referring to FIG. 10, at S03-1, the test determination module 105 receives the analysis result from the analyzing section A, which indicates one or more functions subjected for the operation test. For example, the analysis result includes information regarding the class name that corresponds to the service name such as "SampleService" or "CGIService" such that the analysis result may be expressed in the form of "class name" followed by "object;". Further, as described above referring to FIG. 5 or 6, the analysis result may be displayed in the form of character string or icon, or in the form of character string and icon. For example, in the example case of character string, the analysis result of "SampleService service;" may be displayed. In such case, the string "SampleService" is extracted as the class name, and the function name such as "calc" that corresponds to the class name may be obtained.

At S03-2, the test determination result 105 refers to the service function information table 112, which may be illustrated in FIG. 8.

At S03-3, the test determination result 105 obtains property data such as the mode data, which corresponds to the function name indicated by the analysis result to generate the determination result. More specifically, in this example, the determination result indicates that the operation test for the function is to be performed by the first test module 106 when the mode of the function indicates that the process to be performed by the function does not cause the state of the web service to physically change. The determination result indicates that the operation test for the function is to be performed by the second test module 109 when the mode of the function indicates that the process to be performed by the function causes the state of the web service to physically change.

At S03-4, when the determination result indicates that the operation test for the function indicated by the analysis result is to be performed by the second test module 109, the operation proceeds to S04 to cause the second test module 109 to perform the operation test. When the determination result indicates that the operation test for the function indicated by the analysis result is to be performed by the first test module 106, the operation proceeds to S05 to cause the first test module 109 to perform the operation test.

Referring now to FIG. 11, operation of performing the operation test, performed by the second test module 109 at S04 of FIG. 10, is explained according to an example embodiment of the present invention.

At S04-1, the second test module 109 obtains the analysis result indicating one or more services that may be used for the operation test. As described above referring to FIGS. 4 to 9, the analysis result includes service function information indicating one or more services that may be used for determining whether the software under development properly operates. In this example, the second test module 109 performs the operation test for the function indicated by the analysis result when execution of such function causes the web service to physically change its state. In one example, as illustrated in FIG. 8, when the mode of the function corresponds to "edit", which performs the process of editing data provided by the web service, the second test module 109 is caused to perform the operation test. In another example, when the mode of the function corresponds to "output", which performs the process of storing new data in the web service, the second test module 109 is caused to perform the operation test.

In order to perform S04-1 of allowing the second test module 109 to obtain the analysis result, the test section B may be additionally provided with a service function information obtain module capable of receiving the analysis result. Further, in order to perform S04-1 of allowing the second test module 109 to obtain service function information from the service store module 108, the test section B may be additionally provided with a service function information read module capable of reading the service function information. Referring back to FIG. 3, the service function information obtain module and the service function information read module may be each implemented by the test result receive module 110.

At S04-2, the second test module 109 generates the test result indicating the simulated result of performing the operation test for the function indicated by the analysis result. In this example, even when the function indicated by the analysis result requires access to the web service provided by the service server 2 through the network 3, the second test module 109 performs the operation test without accessing the web service. This eliminates the need for the user to have authorization or approval to execute the function that causes the state of the web service to physically change, since the function is not executed on the web service. This improves the efficiency in software development as the time needed for obtaining authorization or approval can be eliminated.

In order to check whether the function properly operates without accessing the web service, the second test module 109 refers to the template data stored in the service function information table 112. In this example, the template data specifies a data format of the response that is expected to receive from the web service. This is because, in the process of developing software, the operation test does not have to be performed on data that is present on the network 3, as long as the operation test is capable of determining whether the function can receive an expected result from the web service.

Referring to FIG. 13 illustrates an example data format of the template data. The template data of FIG. 13 is written in XML format, and includes a plurality of tags such as <title>, <subtitle>, <link href="http://example.com/service/">, <update>, <author>, <name>, <email>, <id>, <entry>, and <feed>. If software were to access the web service, information is input into each tag. For example, the user name is input in <name> tag, user's email address is input in <email> tag, and user ID is input in <id> tag. When accessed, the web service may output a response including specific information provided by the web service in the form of XML data such as Atom through the network 3. Atom is one of XML formats for web contents distribution defined by RFC 4287 of Internet Engineering Task Force (IETF). In this example, the software interprets the data structure defined by Atom into a character string.

For example, when developing software that communicates with a web service for managing schedule information for a plurality of users, data that is returned from the web service is expected to include user identification information or user schedule information, from the web service. However, the way of exchanging data such as a data format is previously defined. The operation test is thus needed to only check whether the software under development is capable of interpreting the previously defined data format such that none of the data that is managed by the web service is required. Accordingly, the second test module 109 generates a response by using the template data obtainable from the service function information table 112 without accessing the web service, and returns the response to the software under development to determine whether the software is capable of interpreting the response.

For example, information such as user identification information or user schedule information may be obtainable from the input parameter value of the service function information table 112. The second test module 109 inputs the input parameter value into the template data for the function indicated by the analysis result to generate response data. The second test module 109 determines whether the function indicated by the analysis result properly interprets the response data to generate the result of operation test.

At S04-3, the second test module 109 outputs the test result generated at S04-2.

At S04-4, the test result receive module 110 receives the test result sent by the second test module 109.

Referring to FIG. 12, operation of performing the operation test, performed by the first test module 106 at S05 of FIG. 10, is explained according to an example embodiment of the present invention.

In this example, the test determination result 105 causes the first test module 106 to perform the operation test, for example, when the property data indicating the mode of the function subjected for the operation test corresponds to "collection", which indicates the process of obtaining data managed by the web service.

At S05-1, the first test module 106 obtains the analysis result indicating one or more services that may be used for the operation test, such as information indicating the service ID of the service subjected for the operation test. S05-1 may be performed by a service function information read module capable of reading service function information, which may be optionally provided.

At S05-2, the first test module 106 refers to the service identifier information table 111 to determine whether the service that corresponds to the service ID obtained from the analysis result is found. When the web service is found, the operation proceeds to S05-3. When the web service is not found, the operation ends.

In this example, it is assumed that the service to be performed by the first test module 106 does not perform any process that causes data on the web service to physically change, for example, by editing existing data or storing new data.

At S05-3, the first test module 106 obtains the service identifier information that corresponds to the obtained service ID, such as the URL.

At S05-4, the first test module 106 accesses the web service through the communication module 107 using the URL obtained at S05-3, and executes the function subjected for the operation test.

At S05-5, the first test module 106 receives a response, which is the result of executing the function, from the web service. S05-5 of receiving the response may be performed by a web service result module, which may be optionally provided.

For example, the response having a similar data format illustrated in FIG. 13 may be returned from the web service, which includes a plurality of tags such as <title>, <subtitle>, <link href="http://example.com/service/">, <update>, <author>, <name>, <email>, <id>, <entry>, and <feed>. When accessed the web service, information is input into each tag.

Further, in this example, as illustrated in FIG. 6 or 9, for example, the screen displayed by the display module 103 may be provided with a key K, which allows the user to instruct the PC 1 to perform the operation test for one or more functions that are currently displayed in the screen.

Referring to FIGS. 13 and 14, operation of displaying the test result, performed by the display section C at S06 of FIG. 4, is explained according to an example embodiment of the present invention.

The display section C includes the display module 103, which displays the test result generated by either one of the first test module 106 and the second test module 109 through the LCD 60 of FIG. 4.

In one example, the display module 106 may cause the LCD 60 to display the screen having the test result such as the test result illustrated in FIG. 13. When the operation test is performed by the first test module 106 while accessing the web service, the screen of FIG. 13 is generated based on the result of performing the process requested by the function obtained from the web service through the network 3. When the operation test is performed by the second test module 109 without accessing the web service, the screen of FIG. 13 is generated based on the response that is generated by the second test module 109 by inputting the input parameter value into each entry provided by the template data, each of which are obtained from the service function information table 112 using the function indicated by the analysis result as a key. Referring to FIG. 13, when the response is written in XML format such as Atom, the response includes a character string indicated by the XML attribute name and the XML attribute value.

In another example, in addition to the result of performing the function or the response generated using the template data, information indicating whether the operation test is performed by the first test module 106 or the second test module 109 may be displayed to the user. In one example, such information indicating whether the operation test is performed by the first test module 106 or the second test module 109 may be displayed together with the result of the operation test. In such case, a character string indicating whether the operation test is performed by the first test module 106 or the second test module 109 may be additionally included. In this manner, the user may easily recognize whether the test result is the result of actually executing the function while accessing the web service, or the test result is the result of simulating execution of the function without accessing the web service.

In another example, the display module 103 may cause the LCD 60 to display the test result generated either by the first test module 106 or the second test module 109 using a web application, as illustrated in FIG. 14. In such case, the display module 103 may be provided with a converting module, which converts the test result into a format compatible with the web application.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, as described above referring to FIG. 3, the set of software components may be stored in any desired storage device, together with other set of software component available for use. In such case, the service store module 108 may register the set of software components in the memory of the software development assistant apparatus 1 to make the set of software components readily available for the user.

Further, as described above, any one of the above-described and other methods of the present invention may be embodied in the form of a computer program stored in any kind of storage medium as package software for distribution. Examples of storage mediums include, but are not limited to, floppy disk, flexible disk, hard disk, optical discs such as CD-ROM (compact disc read only memory), DVD (digital versatile disc), magneto-optical discs, magnetic disks, magnetic tapes, involatile memory cards, ROM (read-only-memory), semiconductor memory, etc.

Alternatively, any one of the above-described and other methods of the present invention may be embodied in the form of a computer program stored in any kind or any desired number of storage device accessible through a network. Any portion of the computer program may be downloaded through the network such as a local area network (LAN) or the Internet, which may be wired or wireless, onto a computer to be stored in an internal memory of the computer such as a hard disk drive.

Alternatively, any one of the above-described and other methods of the present invention may be embodied in the form of a computer program stored in any kind or any desired number of storage device in a computer. For example, the computer program may be previously installed onto a hard disk drive of the computer for distribution with the computer. In another example, the computer program may be temporarily or permanently installed onto a memory of the computer as a unit.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. A software development assistance apparatus of assisting a user in a process of developing software, the apparatus comprising:
  a service store module to store in a memory service function information regarding one or more functions provided by a set of software components available for use in developing the software, the set of software components providing at least a function to access a web service through a network;
  an analyzing module to analyze the software under development to generate an analysis result indicating at least one function to be used for an operation test of determining whether the software under development properly operates;
  a first test module to perform the operation test using the at least one function indicated by the analysis result while accessing the web service;
  a second test module to perform the operation test using the at least one function indicated by the analysis result without accessing the web service;
  a test determination module to obtain service function information that corresponds to the at least one function indicated by the analysis result from the service function information stored in the service store module, to determine whether the operation test is to be performed by the first test module or the second test module based on the service function information that corresponds to the at least one function indicated by the analysis result to generate a determination result, and to cause one of the first test module and the second test module that is selected based on the determination result to generate a test result by performing the operation test; and
  a display module to display the test result through a display device, wherein:
  the service function information stored in the memory includes property data specifying a process to be performed by the corresponding function with respect to the web service, and
  the test determination module obtains property data that corresponds to the at least one function indicated by the analysis result, and determines that the operation test should be performed by the second test module when the property data indicates that execution of the at least one function indicated by the analysis result causes a state of the web service to be physically changed.

2. The apparatus of claim 1, wherein:
  the service function information stored in the memory includes template data defining a data format of the software under development, and when the determination result indicates that the operation test should be performed by the second test module,
  the second test module obtains template data that corresponds to the at least one function indicated by the analysis result from the service function information stored in the memory, and generates the test result using the obtained template data.

3. The apparatus of claim 2, wherein the property data is mode data specifying the process to be performed by the corresponding function with respect to data managed by the web service, the mode data specifies at least one of:
  process of collecting the data managed by the web service;
  process of editing the data managed by the web service; and
  process of adding data to the data managed by the web service,
  wherein, when the mode data specifies either one of the process of editing and the process of adding, the test determination module determines that the operation test should be performed by the second test module.

4. The apparatus of claim 3, wherein the test result displayed by the display module includes information indicating whether the operation test is performed by the first test module or the second test module.

5. The apparatus of claim 4, further comprising:
  an input module to receive a user input from the user through an operation device, wherein the user input identifies at least one function to be integrated into the software under development, wherein:

the analyzing module generates the analysis result based on the user input to cause the at least one function indicated by the analysis result to reflect the at least one function identified by the user input.

6. The apparatus of claim 5, wherein the display module is further configured to display the at least one function to be integrated into the software under development when the user input is received in at least one display format selected from:
   a first format to display the at least one function in the form of character string; and
   a second format to display the at least one function in the form of icon.

7. The apparatus of claim 5, wherein:
   the service store module is further configured to store service identification information regarding identification of one or more services provided by the set of software components available for use in developing the software, and
   the analyzing module is further configured to cause the display device to display a screen including:
      a first section to display a plurality of graphical images each representing the one or more services provided by the set of software components available for use in developing the software; and
      a second section to display at least one of the plurality of graphical images that corresponds to the at least one function to be integrated into the software under development, when the at least one of the plurality of graphical images is selected by the user input from the first section.

8. The apparatus of claim 7, wherein when the graphical image displayed in the second section is selected by the user through the operation device, the analyzing module is further configured to:
   obtain, from the service function information stored in the service store module, service function information indicating at least one function provided by the at least one function to be integrated into the software under development that is represented by the graphical image selected by the user; and
   display the obtained service function information on the screen.

9. The apparatus of claim 5, wherein:
   the service store module is further configured to store service identification information regarding identification of one or more services provided by the set of software components available for use in developing the software, and when the user input identifies the at least one function to be integrated into the software under development in the form of a character string,
   the analyzing module is further configured to extract an object that corresponds to an argument from the character string, and obtain service that corresponds to the extracted object from the one or more services provided by the set of software components using the service identification information.

10. A method of assisting a user in a process of developing software, the method comprising:
   storing, in a memory, service function information regarding one or more functions provided by a set of software components available for use in developing the software, the set of software components providing at least a function to access a web service through a network;
   analyzing the software under development to generate an analysis result indicating at least one function to be used for an operation test of determining whether the software under development properly operates;
   providing a first test module to perform the operation test using the at least one function indicated by the analysis result while accessing the web service;
   providing a second test module to perform the operation test using the at least one function indicated by the analysis result without accessing the web service;
   determining whether the operation test is to be performed by the first test module or the second test module based on service function information that corresponds to the at least one function indicated by the analysis result obtained from the service function information stored in the service store module to generate a determination result;
   causing one of the first test module and the second test module that is selected based on the determination result to generate a test result by performing the operation test; and
   displaying the test result through a display device, wherein:
   the service function information stored in the memory includes property data specifying a process to be performed by the corresponding function with respect to the web service, and
   the determining whether the operation test is to be performed by the first test module or the second test module includes obtaining property data that corresponds to the at least one function indicated by the analysis result, and determining that the operation test should be performed by the second test module when the property data indicates that execution of the at least one function indicated by the analysis result causes a state of the web service to be physically changed.

11. The method of claim 10, further comprising:
   receiving a user input from the user through an operation device, wherein the user input identifies at least one function to be integrated into the software under development,
   wherein the analysis result is generated based on the user input to cause the at least one function indicated by the analysis result to reflect the at least one function identified by the user input.

12. The method of claim 11, further comprising:
   storing, in the memory, service identification information regarding identification of one or more services provided by the set of software components available for use in developing the software; and
   displaying a screen through the display device, the screen including:
      a first section to display a plurality of graphical images each representing the one or more services provided by the set of software components available for use in developing the software; and
      a second section to display at least one of the plurality of graphical images that corresponds to the at least one function to be integrated into the software under development, when the at least one of the plurality of graphical images is selected by the user input from the first section.

13. The method of claim 12, further comprising:
   storing, in the memory, the set of software components available for use in developing the software.

14. A non-transitory computer readable recording medium including computer program instructions which cause a computer to execute a method of assisting a user in a process of developing software, the method comprising:
   storing, in a memory, service function information regarding one or more functions provided by a set of software components available for use in developing the software, the set of software components providing at least a function to access a web service through a network;

analyzing the software under development to generate an analysis result indicating at least one function to be used for an operation test of determining whether the software under development properly operates;

providing a first test module to perform the operation test using the at least one function indicated by the analysis result while accessing the web service;

providing a second test module to perform the operation test using the at least one function indicated by the analysis result without accessing the web service;

determining whether the operation test is to be performed by the first test module or the second test module based on service function information that corresponds to the at least one function indicated by the analysis result obtained from the service function information stored in the service store module to generate a determination result;

causing one of the first test module and the second test module that is selected based on the determination result to generate a test result by performing the operation test; and displaying the test result through a display device, wherein:

the service function information stored in the memory includes property data specifying a process to be performed by the corresponding function with respect to the web service, and the determining whether the operation test is to be performed by the first test module or the second test module includes obtaining property data that corresponds to the at least one function indicated by the analysis result, and determining that the operation test should be performed by the second test module when the property data indicates that execution of the at least one function indicated by the analysis result causes a state of the web service to be physically changed.

* * * * *